United States Patent [19]

Hulls

[11] Patent Number: 4,552,991

[45] Date of Patent: Nov. 12, 1985

[54] ABSOLUTE POSITION COORDINATE DETERMINING DEVICE EMPLOYING A SINGLE PHASE DIFFERENCE MEASUREMENT TO DETERMINE CURSOR POSITION

[75] Inventor: Leonard R. Hulls, North Falmouth, Mass.

[73] Assignee: Numonics Corporation, Lansdale, Pa.

[21] Appl. No.: 548,317

[22] Filed: Nov. 3, 1983

[51] Int. Cl.⁴ ............................................ G08C 21/00
[52] U.S. Cl. ...................................................... 178/19
[58] Field of Search ............... 178/19, 18; 340/870.31; 324/239; 318/687; 323/212, 218

[56] References Cited

U.S. PATENT DOCUMENTS 4,014,015 3/1977 Gundlach ........................ 336/130 X Primary Examiner—Stafford D. Schreyer
Attorney, Agent, or Firm—Paul & Paul

[57] ABSTRACT

A two dimensional digitizing system comprising two systems at right angles, each system having at least two conducting grid systems. Each grid system is comprised of a number of windings with a pitch distance D and an equal number of windings with a pitch distance $D + \Delta d$, where $\Delta d$ is a small increment in distance. These windings produce a number of voltages whose amplitude varies cyclically as an AC excited cursor coil is moved in a direction at right angles to the conductors in a plane parallel to the plane of the conductors. Active or passive networks are provided for converting the grid voltages into signals whose phase with reference to the cursor coil excitation current varies linearly with cursor position. These signals are cyclic in nature going through a phase displacement of 360 degrees when the cursor moves through distance D in the case of one grid winding and a distance $D + \Delta d$ in the case of the other grid winding. A single phase measuring system is used to provide a signal linearly related to cursor position by producing an output signal proportional to the phase difference between these two signals. This signal can be used to provide non ambiguous absolute positioning of a cursor coil on a digitizer tablet providing the maximum dimension of the tablet is less than $$\frac{D(D + \Delta d)}{\Delta d}$$

The system is used either alone or combined with a cyclical position signal to provide a more precise coarse/fine digitizing system.

6 Claims, 11 Drawing Figures

(a)

(b)

(c)

ABSOLUTE POSITION COORDINATE DETERMINING DEVICE EMPLOYING A SINGLE PHASE DIFFERENCE MEASUREMENT TO DETERMINE CURSOR POSITION

BACKGROUND OF THE INVENTION

Many digitizers use the electromagnetic coupling between grid wires imbedded in a tablet and a cursor coil as a means for developing the electric signals used in determining the X and Y coordinates of the cursor position. In most cases the electrical signals induced in the grid windings are phase shifted and combined to produce a signal whose phase shift relative to the cursor coil excitation current is a linear function of cursor position.

Typically, the phase shift increases linearly from 0 to 360 degrees as the cursor coil moves through a distance equal to the pitch distance of the grid winding. When cursor movement continues in the same direction the phase changes abruptly to zero and increases linearly with position to 360 degrees as the cursor moves through successive intervals of length equal to the pitch distance. The position signal is therefore cyclical and can be used to accurately determine the position of the cursor coil within any given cycle. In order to provide absolute position information, the location of the particular cycle must be known as well as the position of the cursor coil within the cycle.

A convenient method of providing an absolute position signal for identifying individual cycles is to construct two position systems similar in every respect except for their pitch distances which differ fractionally by a small distance $\Delta d$. Subtracting the position measurement derived from one system from the measurement derived from the other produces a signal which cycles over longer intervals of movement than either of the two signals from which it is derived.

FIG. 1 shows two cyclical position signals produced by measuring phase shift. Signal 1 is obtained from a grid winding with a pitch distance of D and signal 2 is obtained from a grid winding with a winding pitch distance of $D + \Delta d$. The signal 3 obtained by subtracting 1 from 2 is discontinuous, going through an abrupt change every time either signal 1 or signal 2 completes a cycle. In order to obtain a simple continuous linear relationship between cursor coil position and phase shift, it is necessary to add the maximum amplitude of signal 1 to signal 3 whenever signal 2 is greater than signal 1. Signal 4 is the result of performing this addition on signal 3. Signal 4 can be used to provide an indication of cursor absolute position or more commonly it is combined with the information available from either signal 1 or 2 to form a course/fine system with superior absolute positioning accuracy.

A discussion of an absolute position coordinate determining device of the type involved in the present application is contained in U.S. Pat. No. 3,735,044. The technical description contained in that patent is incorporated into this application as background information to the same extent as if fully set forth herein.

SUMMARY OF THE INVENTION

A principal object of the present invention is to provide an absolute positioning system where the position information is derived from a single measurement of the phase of one signal relative to another.

Another object is to provide a position signal which can be used as the coarse signal in a coarse/fine positioning system.

Another object is to reduce the complexity and quantity of the electronic hardware used to produce the position signal.

Another object is to increase the rate at which information can be digitized by minimizing the number of circuit functions required to produce the position signal.

These and other objects are achieved by providing an absolute cursor position derived from a single phase difference measurement.

The single phase difference measurement system described in this application offers a number of advantages, as follows, over systems using two phase measurements and subtracting the results to generate an absolute position signal 1. The single phase difference measurement system described reduces the quantity and complexity of the electronic hardware required to produce an absolute position signal.

2. The single phase difference measurement system is more accurate than systems which determine absolute position on the basis of the sometimes small difference between two large phase shift measurements.

3. The single phase difference measurement system is capable of higher speed digitizing.

4. The single phase difference measurement system eliminates the requirement for a reference signal provided by the cursor coil excitation source.

BRIEF DESCRIPTION OF THE DRAWINGS

Further objects, features, and advantages of this invention, which is defined by the appended claims, will become apparent from a consideration of the following description and the accompanying drawings in which:

DETAILED DESCRIPTION OF THE PREFERRED EMBODIMENTS

Figure 1:
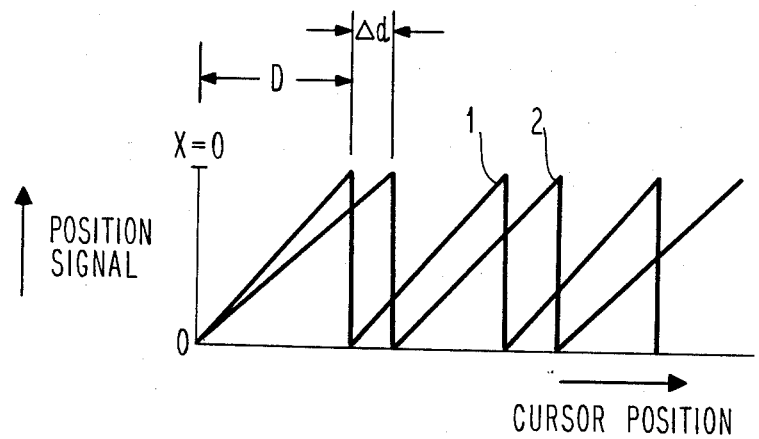
FIGS. 1(a), 1(b) and 1(c), are graphical illustrations showing how two position signals can be combined to produce an absolute position signal.
Figure 1:
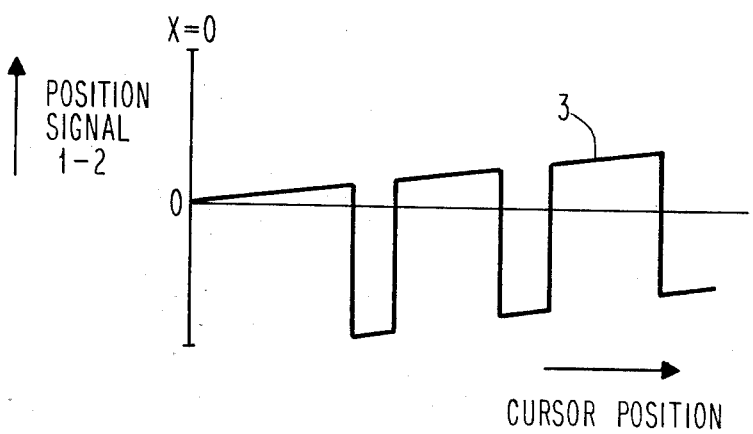
Figure 1:
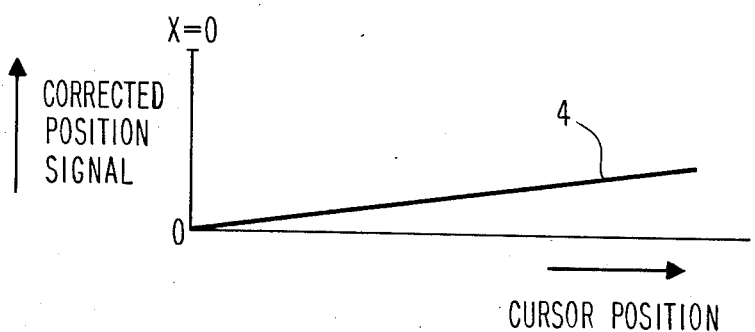

Single phase difference measurement absolute position determining is applicable to systems where position is a monotonic (preferably linear) cyclic function of the phase difference between an AC signal and a reference signal of the same frequency. FIG. 1(a) shows a typical signal as used by such a system. An absolute position signal is defined as a signal which has a unique measurable value corresponding to every cursor position within the entire range of position measurement. A cyclic position signal is defined as one where there is a unique (preferably linear) measurable value corresponding to every cursor position within an interval of cursor movement equal to the pitch distance of the winding and the signal is precisely duplicated for each cursor movement through successive intervals equal to the pitch distance.

The digitizer comprises two identical positioning systems disposed at right angles corresponding to the X and Y axes of a coordinate system. For ease of understanding, the following description will be confined to the single positioning system used to provide the X coordinate information.

In a system using the phenomena of electromagnetic coupling between a cursor coil and an arrangement of grid windings, either cursor coil or grid windings may be excited. When the cursor coil is excited, the induced signals are separately available at the various terminals of the grid windings. When the grid windings are excited, this must be done separately and in sequence to preserve the identity of the signals induced in the cursor coil as otherwise the cursor signal would be the sum of all the induced signals. Consequently, cursor excitation is the preferred arrangement because it avoids the complexity entailed in separately and sequentially exciting the grid windings.

Figure 2:
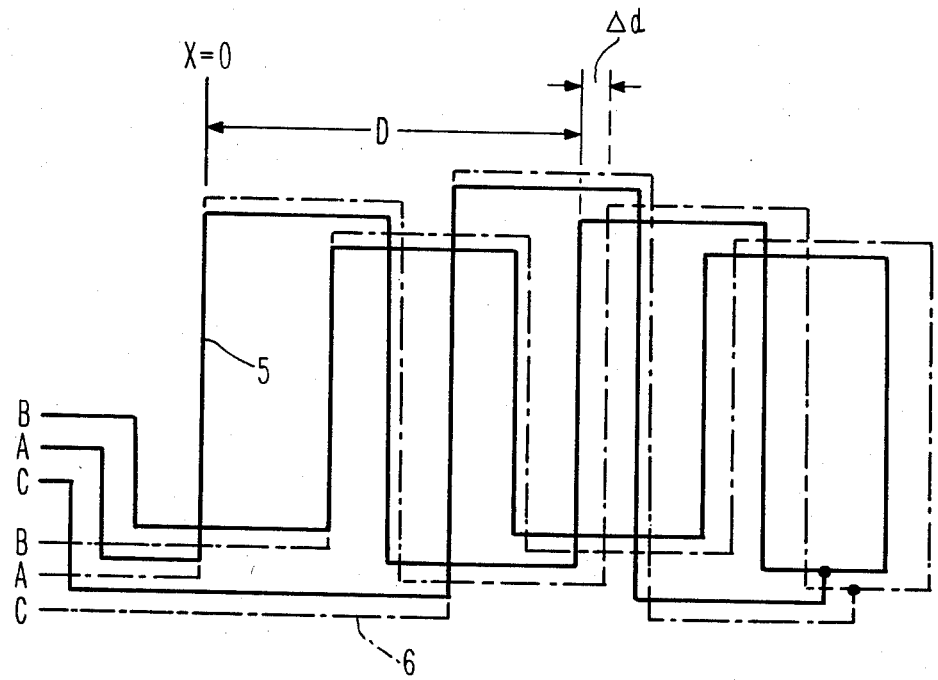
FIG. 2 is a drawing of the grid wire structure used in producing phase related position signals.
Figure 3:
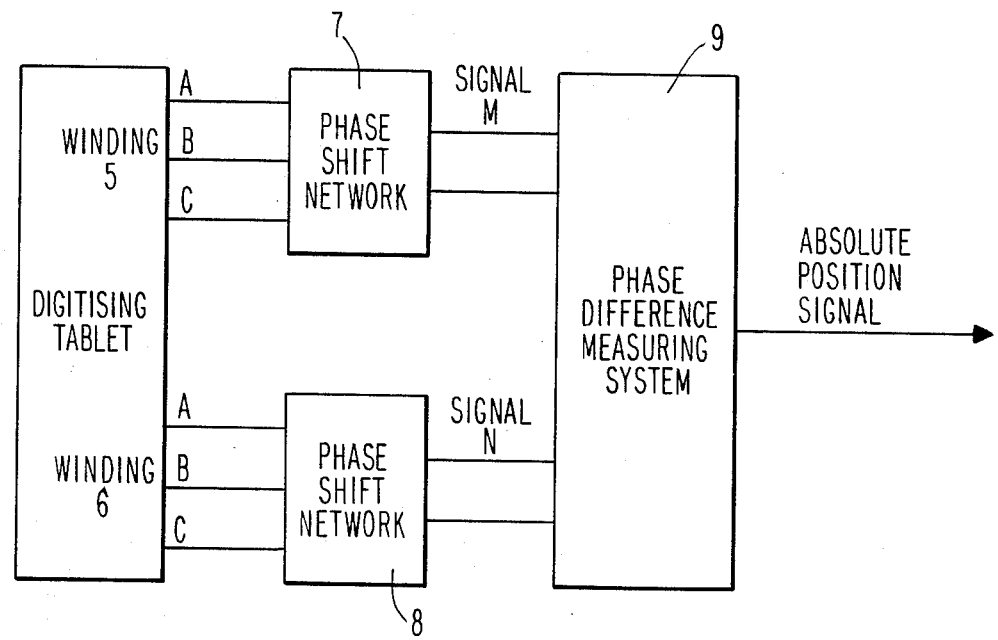
FIG. 3 is a schematic diagram showing how an absolute position signal can be produced from a single phase difference measurement.

FIG. 2 shows the grid winding arrangement for the X coordinate position system of an absolute positioning system. The winding arrangement comprises two separate grid windings 5 and 6 shown in FIG. 2. Each winding is a single three terminal winding with terminals A, B and C, of the kind described in my co-pending patent application, Ser. No. 544,615, filed Oct. 24, 1983 entitled Polyphase Digitizer. Winding 5 has a pitch distance D and winding 6 has a pitch distance D+Δd, where Δd is a small increment in distance. The three terminals of winding 5, FIG. 3, are connected to a five-terminal passive phase shift network 7 of the kind described in my aforesaid co-pending patent application. The output from network 7 is an AC signal whose phase shift increases linearly, relative to the cursor coil excitation signal, with cursor coil position by 360 degrees for every traversal of the cursor coil through the pitch distance D. A similar phase shift network 8 is connected to the terminals of grid winding 6 to provide a signal that shifts 360 degrees for every traversal of the cursor coil through a distance D+Δd. It is convenient for the purpose of explanation to describe the output signals from phase shift networks 7 and 8 by the two continuously rotating vectors M and N as shown by 17 and 18 in FIG. 4.

Figure 4:
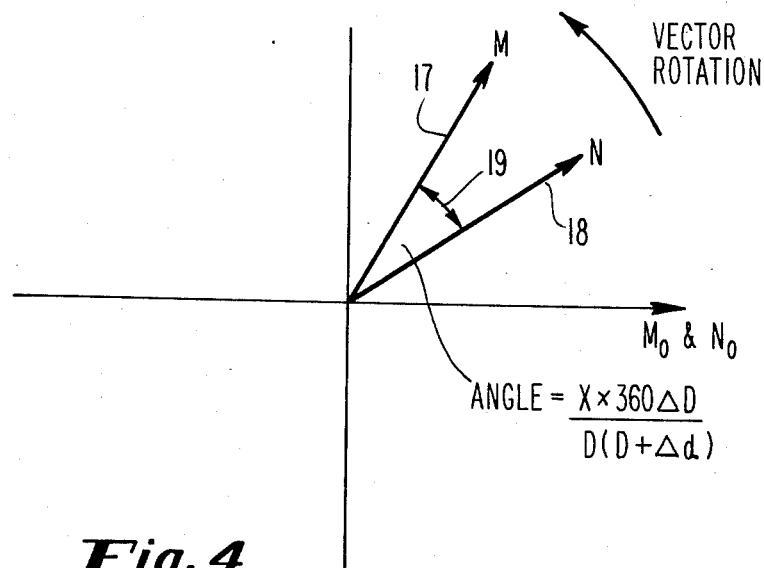
FIG. 4 shows the vectorial relationships of the two signals produced by summing and phase shifting the signals induced in the grid winding.

If the first conductor connected to the A terminal of grid winding 5 is coincident with the first conductor connected to the A terminal of grid winding 6 and the location of these two coincident conductors is defined by the coordinate x×0 then the rotating vectors $M_o$ and $N_o$ generated by the cursor coil positioned at x=0 are identical as shown in FIG. 4. If the cursor coil is now moved to the coordinate position x the $M_o$ vector will have rotated through x/D×360 degrees and the $N_o$ vector will have rotated through $$\frac{x}{D + \Delta d} \times 360 \text{ degrees}$$

and the difference in the angle between the two vectors is given by $$\frac{x}{D} \times 360 - \frac{x \times 360}{D + \Delta d} = x \times 360 \frac{\Delta d}{D(D + \Delta d)}$$

This angle is shown by 19 in FIG. 4.

To provide absolute positioning, the maximum phase shift between the two vectors must not be allowed to exceed 360 degrees since there is no physically realizable way of eliminating the ambiguity which results from the impossibility of distinguishing between 0 and 360 degrees phase shift.

The maximum distance ($x_{max}$) over which an absolute or non-ambiguous signal occurs is defined by the following equation $$360 = x_{max} \times \frac{360 \times \Delta d}{D(D + \Delta d)}$$

Therefore $$x_{max} = \frac{D(D + \Delta d)}{\Delta d}$$

It is thus shown that a single phase shift measurement made by the measuring system 9 of FIG. 3, made on the output signal from network 8 using the signal from network 7 as reference, provides a non-ambiguous absolute position signal over a distance of $$\frac{D(D + \Delta d)}{\Delta d}.$$

The phase shift measuring device 9 may consist either of a system for measuring the time interval between successive zero crossings of the signals from network 7 and 8, or in a simpler embodiment the device may consist of a conventional phase sensitive demodulator.

The system is applicable to any polyphase system where the essential characteristic of the signal produced by the voltages induced in a grid winding is represented by a rotating vector where a single rotation corresponds to a fixed interval of cursor coil displacement referred to as the pitch distance of the grid winding.

The simplicity of the circuitry used to produce the position signal makes this system ideal for applications requiring high digitizing speed. The accuracy of the system assuming perfect geometrical precision in construction of the grid windings is limited to the precision of the phase measurement. If greater precision is required the system can be used to construct a coarse/fine positioning system.

Let it be supposed that a system is constructed using two windings with a pitch distance of 4 centimeters (4+0.4) centimeters respectively; then the maximum value of the x coordinate $x_{max}$ is given by $$x_{max} = \frac{4(4 + 0.4)}{0.4} = 44 \text{ centimeters}$$

If the precision with which a phase measurement can be made is 1 part in 1000 the system error will be 0.044 centimeters. However, if the measurement is based upon the cyclical signal available from a winding with a pitch distance of 4.4 centimeters, the position accuracy will improve tenfold to 0.0044 centimeters, assuming the same precision in the phase measuring system.

In order to establish the absolute cursor position from the coarse and fine position, it is necessary to introduce a logical procedure for enhancing the accuracy of the coarse absolute position measurement using the higher accuracy provided by the cyclical fine position signal. A first step is to establish how many integral cycles of the fine position measurement are included in the interval of distance defined by the coarse position signal. The absolute position, with accuracy equal to that of the fine position system, is then computed by adding the distance defined by the fine system to the distance attributed to the integral number of fine position signals.

The number of integral cycles can be computed by dividing the phase shift, as determined by the phase difference measuring system 9, by the amount of the phase difference that occurs when the cursor coil moves through a distance equal to the winding pitch $D+\Delta d$, and ignoring the fractional part of the result. Any error, no matter how small, in the coarse position signal may result in the afore-mentioned computation of the number of integral cycles being either one more or one less than the actual number of cycles. In a practical system it is, therefore, essential to include a method for resolving this uncertainty in the computed value for the number of integral cycles. The procedure is to compute the accurate position, compare it to the coarse position information and make a correction as necessary to the computed number of integral cycles based upon the outcome of the comparison. Let it be supposed that the coarse position phase shift measurement is in error by minus e degrees, where e is very slightly less than half the change in phase shift difference that occurs when the cursor coil moves through a distance equal to the winding pitch distance $D+\Delta d$. The following discussion is predicated upon all phase shift values being defined in terms of their equivalent distances. Thus, if the phase shift signals are derived from grid windings with pitch distances of 4 and (4+0.4) centimeters respectively, 360 degrees phase shift in the fine position, as determined by the phase measuring system 13 of FIG. 5, corresponds to a cursor movement of 4.4 centimeters and 360 degrees phase shift in the coarse system as determined by the phase measuring system 9 corresponds to 44 centimeters.

Figure 6:
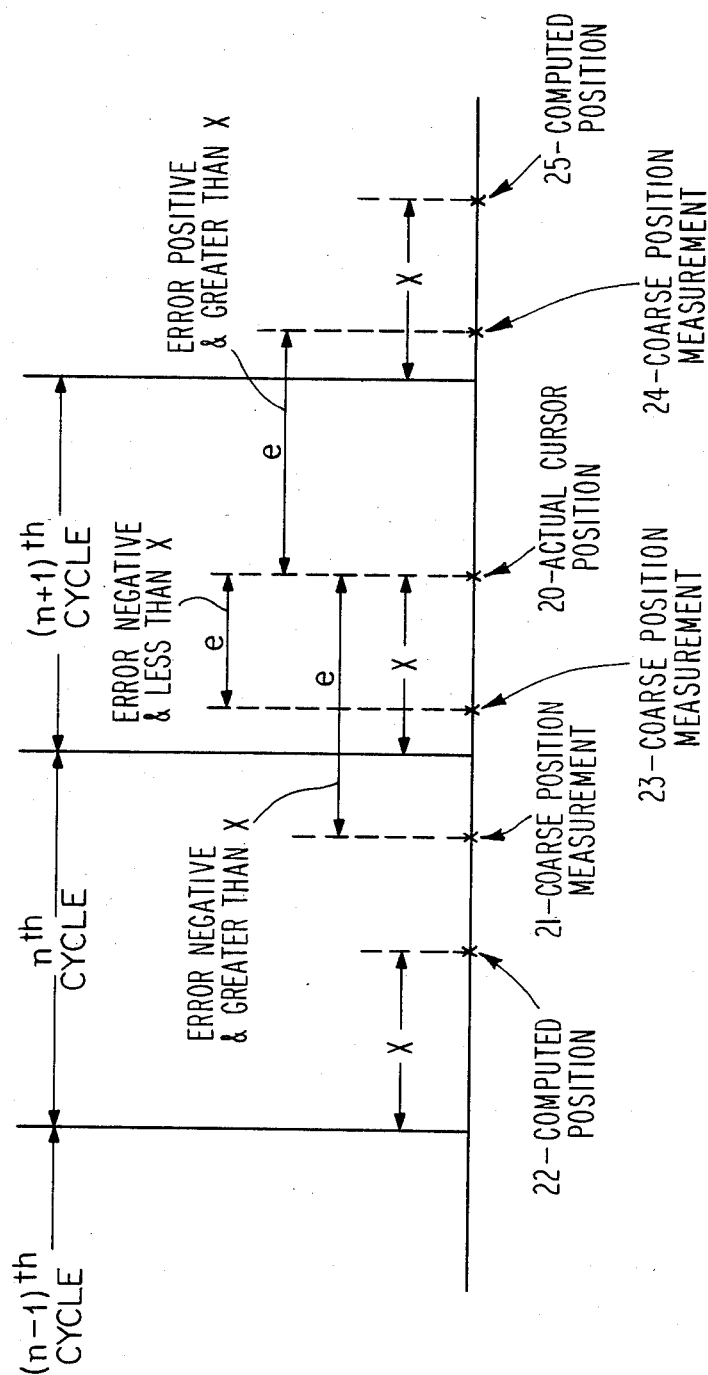
FIG. 6 is a diagram illustrating the basis for the logical manipulation of the coarse and fine signals.

FIG. 6 shows the $(n-1)^{th}$, $n^{th}$ and $(n+1)^{th}$ cycle of the fine position system. Let it be assumed that actual position of the cursor coil is a distance x beyond the end of the $n^{th}$ cycle. In the first instance let it be supposed that the error in the coarse position signal is $-e$ centimeters where e is greater than x. As a result of the error e, the number of integral cycles will be incorrectly computed as $(n-1)$ instead of n. The absolute position will then be computed as $(n-1)$ multiplied by the winding pitch distance added to x. FIG. 6 shows the actual position 20, the position 21 as determined by the coarse position signal and the position 22 as computed from both coarse and fine signals.

These three positions are defined as follows when e is negative and greater than x and p is the pitch distance of the winding Actual position: $20 = np + x$
Coarse position: $21 = (n-1)p + p - e + x$
Computed position: $22 = (n-1)p + x$ The difference between the computed and coarse position is $p - e$. If e is less than half the winding pitch distance this difference is greater than half the winding pitch distance p.

These three positions are defined as follows when e is negative and has a magnitude less than x Actual position: $20 = np + x$
Coarse position: $23 = np + x - e$
Computed position: $20 = np + x$ The difference between the coarse and computed positions is equal to the error e.

If the coarse system error e is positive and of such a magnitude that $e + x$ is greater than p, then the number of integral cycles will be incorrectly computed as $(n+1)$ instead of n.

Under these conditions the three positions are defined as follows

Actual position: $20 = np + x$
Coarse position: $24 = (n+1)p + x + e - p$
Computed position: $25 = (n+1)p + x$ The difference between the coarse and computed position is $e - p$.

Providing the coarse position signal is measured to an accuracy greater than half the winding pitch distance, the following rules can be applied to correct for the ambiguities in the computation of the number of integral cycles. If the computed position is less than the coarse position by an amount greater than half the winding pitch distance, add one to the number of integral cycles and re-compute the position. If the error between the coarse position and the computed signal is less than half the winding pitch distance make no change to the computed position. If the computed position exceeds the coarse position by an amount greater than half the winding pitch distance, subtract one from the number of integral cycles and re-compute the position.

Figure 5:
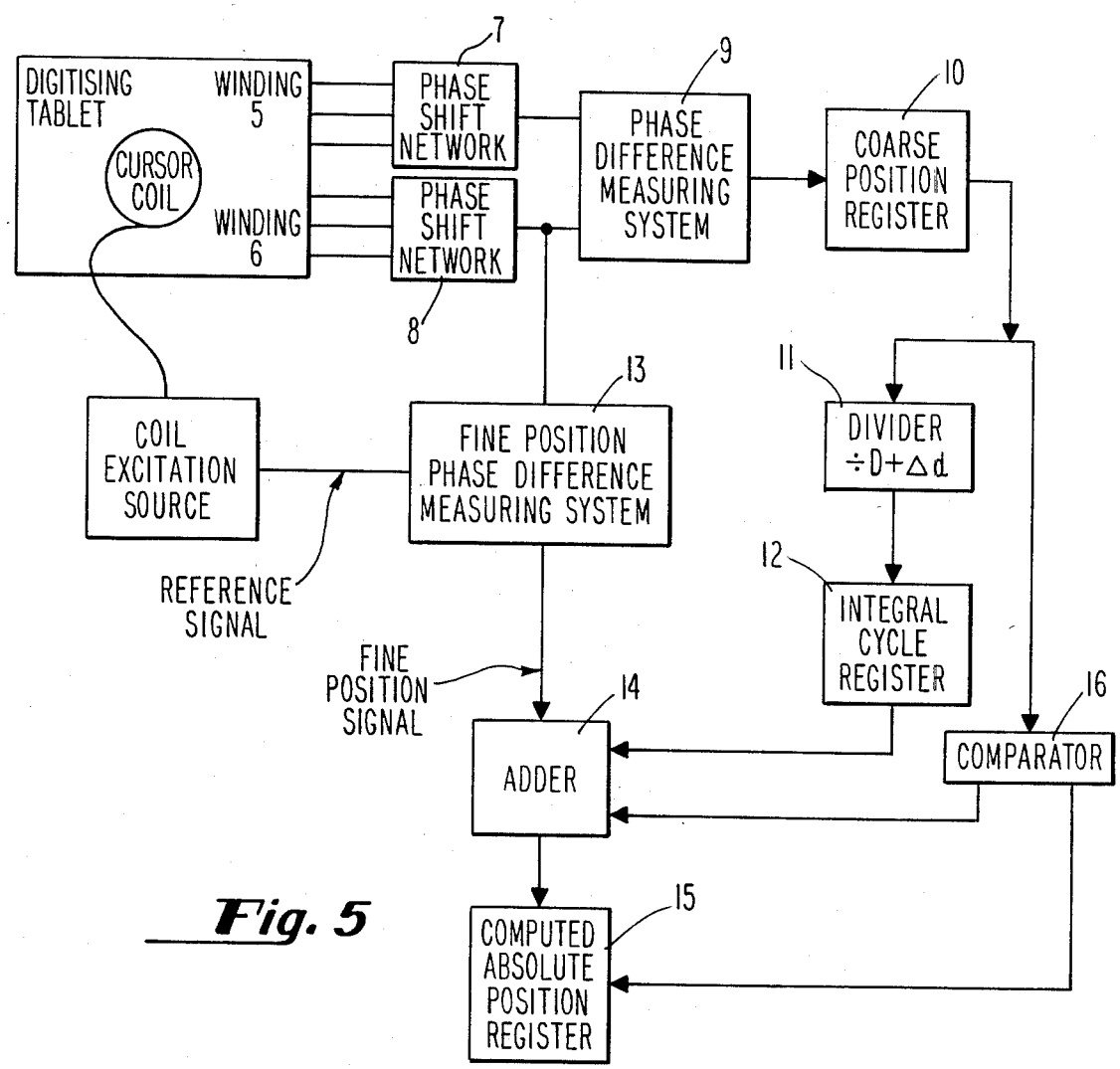
FIG. 5 is a schematic diagram of a coarse/fine position system where the accuracy of the absolute position measurement is enhanced by a cyclical signal obtained from a single grid winding.

FIG. 5 shows the implementation of a coarse/fine position measuring system using a single phase difference measurement to determine the coarse position. The signal from phase measuring system 9 provides the absolute position information that will be used to indicate coarse position. This signal is digitized and used to continuously update the coarse position register 10. Divider 11 divides the number in the coarse position register by the winding pitch distance $D + \Delta d$ and places the integral part of the result in the integral cycle register 12. The fine position signal is generated by phase measuring system 13, digitized and added to the number in the integral register 12 by the adder 14, and the result placed in the computed position register 15. The comparator 16 compares the difference between the contents of the computed position register 15 and the coarse position register 10 and compares the result to half the winding pitch distance $D + \Delta d$. If the difference is greater than $(D + \Delta d)/2$ and negative, the computer directs adder 14 to add 1 to the computed position register 15 and add $-1$ if the difference is greater than $(D + \Delta d)/2$ and positive. In practice, the logical manipulation of the coarse/fine signals can either be achieved by dedicated hardware, as illustrated in FIG. 5, or by a computer system programmed by an equivalent software routine.

The system discussed in the foregoing discussion relates to the grid structures along one of the two axes of the digitizer, for example, along the X axis. An identical grid structure is provided for the Y axis.

Figure 7:
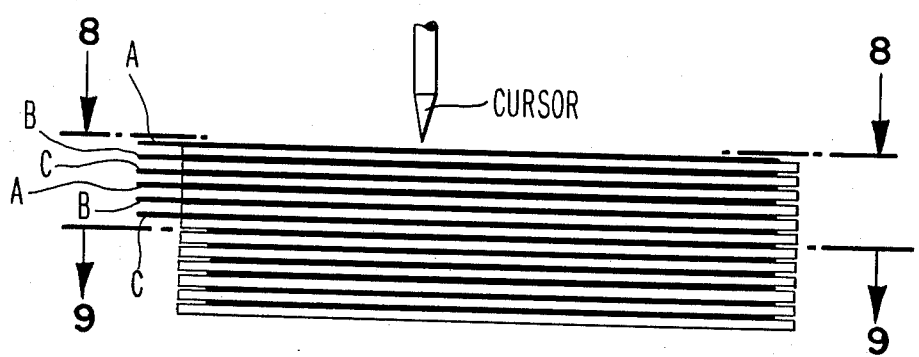
FIG. 7 is an elevational diagrammatical illustration, in section, showing a digitizer tablet having a twelve-layer grid structure, the thickness being exaggerated.
Figure 8:
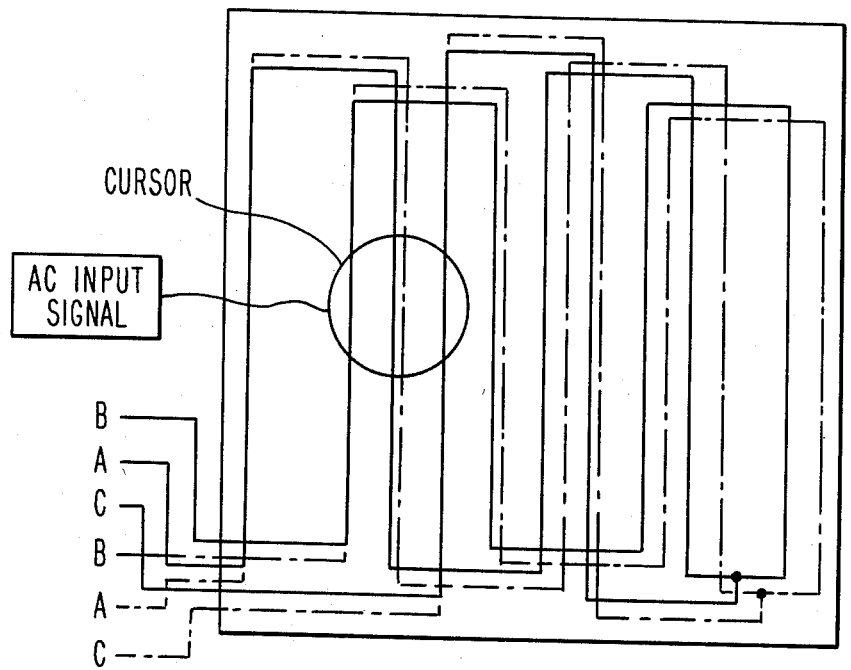
FIG. 8 is a top plan view looking down along the line 8—8 of FIG. 7 illustrating enlarged a portion of the surface area of a digitizer tablet having two three-phase grid structures along the X axis.

FIG. 8 is an enlarged diagrammatic plan view of a portion of the surface area of the digitizer tablet of FIG. 7 illustrating two three-conductor grid structures along the X axis with the pitch of each of the three conductors of one of the grid structures being the same but being slightly different from the pitch of the conductors of the other grid structure.

Figure 9:
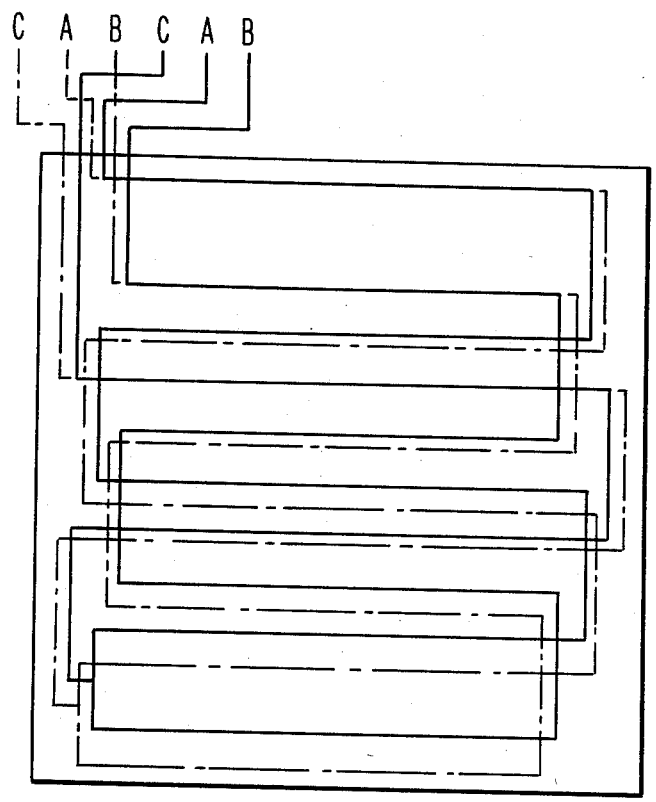
FIG. 9 is a view looking down along the line 9—9 of FIG. 7 illustrating enlarged a portion of the planer area of a digitizer tablet having two three-phase grid structures along the Y axis.

FIG. 9 is a diagrammatic view similar to FIG. 8 but showing the grid structure along the Y axis which is orthogonal relative to the X axis. Except for orientation, the grid structure on the Y axis is identical to that on the X axis.

FIG. 7 is an elevational diagrammatical view of a digitizer tablet illustrating a grid structure having twelve layers, three layers for each multi-terminal grid structure. The illustration in FIG. 10 is of exaggerated thickness in order to illustrate the twelve layers. Insofar as surface area is concerned, the grid structures shown in FIGS. 8 and 9 illustrate only one-and-a-fraction number of cycles, where a cycle is one full turn or pitch, and it will be understood that a full tablet will have a substantially larger number of cycles.

What is claimed is:

1. Apparatus for determining position coordinates of points on a surface, said apparatus including:
   a. two conductive grid-structure systems orthogonally disposed relative to each other in planes parallel to said surface, each system comprising first and second multi-terminal conductive grid structures each grid structure having 'n' terminals, where 'n' is an odd integer greater than one, each grid structure comprising a plurality of substantially equally-spaced parallel grid conductors located parallel to said surface with adjacent conductors being connected to different terminals, each of said conductors having its one end remote from its terminal electrically connected to a corresponding remote end of each of the other of said conductors, said parallel grid conductors being at right angles to a first axis of said surface, each of said conductors of said first grid structure having the same pitch and each of said conductors of said second grid structure having the same pitch, the pitch of said second grid structure being slightly different from the pitch of the first grid structure;
   b. a cursor structure having a conductive coil element adapted to be moved in any direction parallel to and in close cooperative relationship to the plane of said grid conductors;
   c. input means for applying to said cursor coil an alternating-current excitation signal for inducing signal voltages in said grid structures;
   d. first phase-shift network means for combining signal voltages induced in said first grid structure to produce a first signal;
   e. second phase-shift network means for combining signal voltages induced in said second grid structure to produce a second signal;
   f. phase difference measuring means; and
   g. means for applying said first and second signals to said phase-difference measuring means for making a single phase-difference measurement for producing a monotonic signal indicating the absolute position of said cursor.

2. Apparatus according to claim 1 wherein said monotonic function is substantially linear.

3. Apparatus as described in claim 2 wherein each grid winding consists of a single three terminal winding.

4. Apparatus as described in claim 1 wherein each grid winding consists of a single three terminal winding.

5. Apparatus as described in claim 1 wherein the spacing between the parallel conductors of said first and second grid winding is so selected that the phase difference between said first and second signals never exceeds 360 degrees when the cursor coil is moved from one edge of the digitizing surface to the other edge.

6. Apparatus for determining position coordinates of points on a surface, said apparatus including a coarse-position measuring system and a fine-position measuring system, said coarse-position measuring system using a single phase-difference measurement, said apparatus comprising two conductive systems orthogonally disposed relative to each other, each system comprising:
   a. first and second conductive grid structures each having three terminals the pitch of the second grid structure being slightly different from that of the first grid structure, each of said grid structures comprising a plurality of substantially equally-spaced parallel grid conductors located parallel to said surface with adjacent conductors connected to different terminals, each of said conductors having its one end remote from its terminal electrically connected to a corresponding remote end of each of the other of said conductors, said parallel grid conductors being at right angles to a first axis of said surface;
   b. a cursor structure having a circular conductive coil element adapted to be moved in any direction parallel to and in close cooperative relationship to the plane of said grid structure;
   c. an alternating-current excitation signal source and means for applying said excitation signal to said cursor coil for inducing signal voltages in said grid structure;
   d. first phase-shift network means for combining signal voltages induced in said first grid structure to produce a first signal;
   e. second phase-shift network means for combining signal voltages induced in said second grid structure to produce a second signal;
   f. coarse position phase-difference measuring means;
   g. means for applying said first and second signals to said coarse-position phase-difference measuring means for making a single phase-difference measurement for producing a monotonic signal indicating the absolute coarse position of said cursor;
   h. fine-position phase-difference measuring means;
   i. means for applying a signal from said cursor-coil excitation signal source and a signal from said second phase-shift network to said fine-position phase-difference measuring means for developing a fine-position signal;
   j. a divider;
   k. means for applying said coarse-position signal to said divider for dividing said coarse-position signal by the winding pitch distance $D+\Delta D$ to produce an output signal;
   l. an integral cycle register;
   m. means for applying said output signal from said divider to said integral cycle register;

n. an adder;
o. means for applying said fine-position signal and the output of said integral cycle register to said adder;
p. a computed absolute position register;
q. means for applying the output of said adder to said computer absolute position register; and
r. a comparator for determining the difference between the coarse-position signal and the data in the computed absolute position register and for comparing said difference with one-half of said winding pitch distance $D+\Delta D$ and for applying a corrective signal to said adder.

* * * * *